Figure 1:
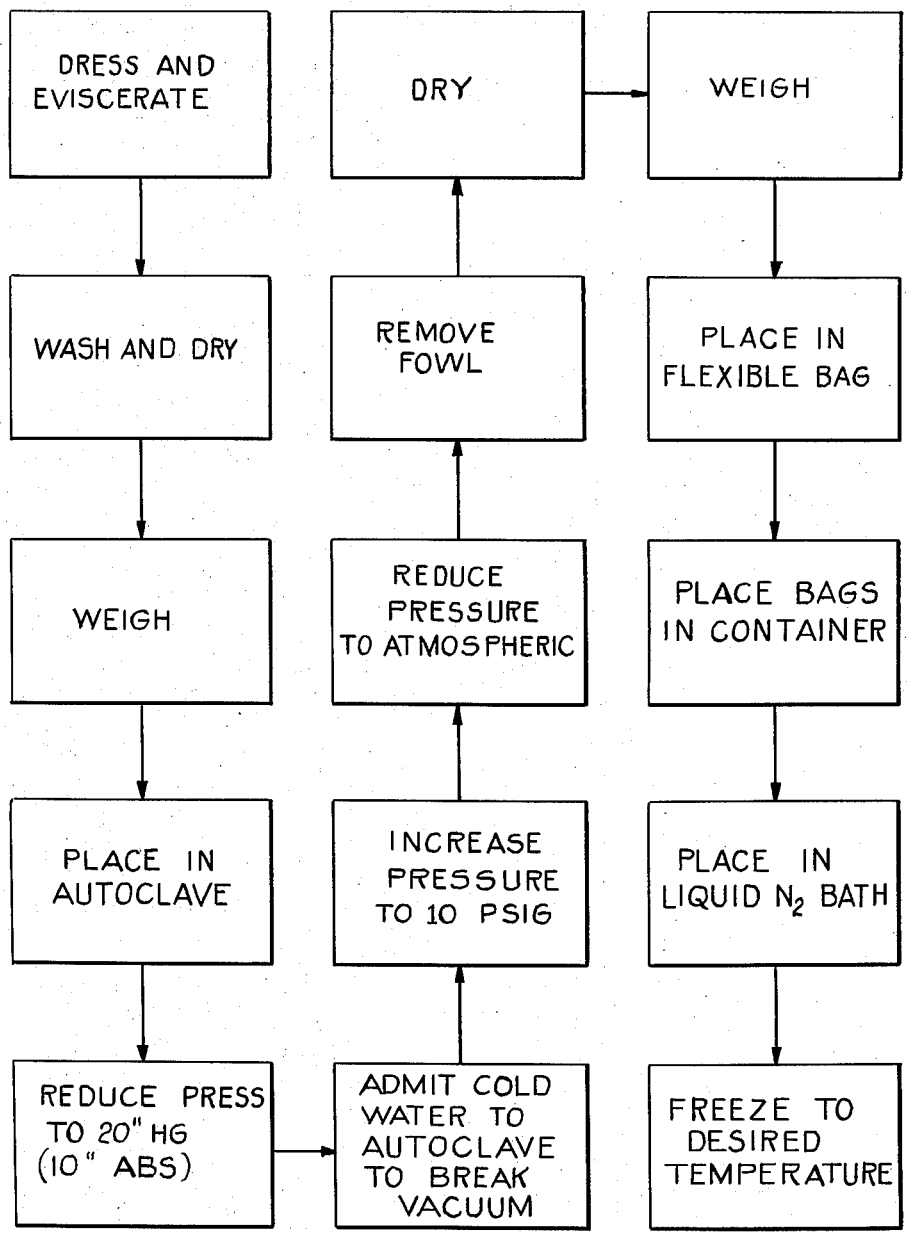

United States Patent Office 2,964,412
Patented Dec. 13, 1960

2,964,412

METHOD OF FREEZING POULTRY

Willard Langdon Morrison, Lake Forest, Ill., assignor, by mesne assignments, to Liquefreeze Company, Inc., New York, N.Y., a corporation of New York Filed Jan. 17, 1958, Ser. No. 709,659

3 Claims. (Cl. 99—194)

My invention relates to an improvement in the method of treating, preserving and freezing such poultry as turkey, chicken and the like. Chicken, and especially turkey, is a dry meat by nature, and after going through several processing steps many of which are conducive to the removal of moisture and being baked in an oven for several hours, the meat may come to the table in a very dry, unflavorful condition. As a consequence it is a good practice to introduce moisture into the poultry carcasses at some stage in the treatment and processing.

For example, after turkeys have been killed and cleaned, the carcasses may be immersed in cold water for an extended period of time so that the naturally dry meat may become saturated with the cold water and the air in certain parts of the carcass may be replaced by water. After the carcass is removed from the water it may be frozen and then bagged for further shipment to the grocery shelves. This lengthy process requires a substantial length of time, in fact many hours, before the carcass is sufficiently cooled and at the same time has taken up the necessary amount of moisture to overcome the initial unsatisfactory dryness of the meat and to compensate for any further losses of water occurring due to later processing steps.

Accordingly a primary object of my invention is the provision of a fast, efficient method of treating, preserving, and freezing poultry.

Another object is the provision of a quick freezing process in which the poultry is exposed to a vacuum condition prior to contact with the cold water bath and freezing agent for removal of entrapped air in the carcass.

A further object of the invention is the provision of a process wherein the moisture content of dry poultry meat is increased to a point where subsequent treatment will not cause a dehydration effect.

Yet another object of the invention is the provision of a process wherein a bath of liquid nitrogen is used to at least initially freeze the skin of the poultry to thereby prevent loss of moisture from the interior portions of the carcass during the remainder of the freezing operation.

Other objects will appear from time to time throughout the specification and claims.

My invention is illustrated more or less diagrammatically in the accompanying drawing wherein:

Figure 1 is a flow sheet illustrating one possible sequence of operations utilized in my novel process.

In present methods of preparing poultry for freezing the birds are killed, eviscerated and the feathers removed. The carcasses are then dropped into a tank filled with cold water or even slush ice so that the temperature of the water will be at approximately 32 degrees F. The carcasses must be kept in the tank for 18 to 20 hours or perhaps longer and it is sometimes necessary to add water to facilitate the moisture take-up.

There are several reasons for immersion in the tank. One purpose is to remove the body heat of the poultry and bring it to a point near the freezing temperature to facilitate freezing. A second purpose is to take up some moisture to compensate for future losses in the freezing cycle and to insure a juicy, more palatable table dish eventually. In many of the present known processes the carcasses are put in a wind tunnel for freezing and as a result a good deal of the moisture is evaporated. Usually about 3% moisture by weight is taken up.

There are certain regions in the carcass, for example the bone structure, which normally contain a good bit of entrapped air. The inability to quickly remove this air and replace it with water in the cells and cavities in these regions may account for the unduly long time that the carcasses must be kept in the tank.

In my novel process the carcasses, after gutting and eviscerating, are placed in a cold chamber and the air is evacuated. The evacuation substantially removes all of the air from the various glands, aperture, sacs etc. in the poultry and then when cold water is admitted to the chamber the water will seek out these empty spaces more readily. The rate of heat transfer and water take-up is even faster if pressure is built up in the chamber. As a result the carcass will become more thoroughly chilled sooner and a larger moisture take-up will be induced than by any currently known process.

My method is illustrated in the accompanying flow diagram. As a first step the carcasses are dressed, eviscerated, and the feathers removed. They are then washed and dried and may be weighed. Next the carcasses are packed in a pressure chamber so that air and water may come into intimate contact with all portions of them. This autoclave or pressure chamber may consist of an inner metal tank surrounded by insulating material with a removable cover. A connection to a vacuum pump may open into the autoclave, and a pair of water lines may be connected near the top and bottom. The top inlet line will lead to a controlled temperature storage water tank which is fed from any suitable source. A compressor may be hooked into either the autoclave or the storage tank. The storage tank may be constructed similar to the autoclave and include a steel jacket surrounded by insulating material. In addition, refrigerator coils may surround the steel jacket in order to bring the temperature of the water down to a desired range. Suitable temperature measuring instruments may be located within the storage tank and so disposed as to be readily readable from the exterior. The outlet water line near the bottom of the autoclave will of course be used as a drain line. The autoclave in addition may have refrigerating coils placed around the inner tank.

After placing the carcasses in the autoclave the cover is tightly closed and the inlet and outlet water line valves are closed after draining all residual water. The vacuum pump is then started and the pressure reduced in the tank. I have found that by reducing the pressure to valves down to 20 inches of mercury (10 inches absolute), the air from the pores, bones and organs of the carcasses are readily removed. The greater the vacuum and the longer it is maintained (up to a point), the more effective the treatment is.

After remaining in the tank under vacuum for anywhere from a few minutes upwards the vacuum is broken by admitting cold water to the autoclave. The carcasses are then soaked for a sufficient period of time to be thoroughly chilled and take-up sufficient moisture. I have found for example that after immersion for approximately two hours, well over 3% moisture may be taken up. They are then removed, dried, weighed, and packaged in suitable containers. In one method the dried carcasses are placed in flexible bags, the bags placed in shipping containers and the containers sent to the freezing station.

The process is substantially accelerated by increasing the pressure in the autoclave during the period in which the carcasses are immersed. After the vacuum is broken and the inlet valve opened to admit the controlled temperature water from the storage tank, the compressor may be operated to bring the pressure in the autoclave up substantially above atmospheric. This increases the rate of moisture take-up in the fowl and serves to reduce the body heat even faster. I have found for example that an increase of pressure to values up to 10 pounds per square inch gauge is very effective in inducing a moisture take-up of approximately up to 10% by weight.

The bagged carcasses in their containers are then sent to the freezing station where they are quick frozen and put in holding chambers for shipment to grocery stores and super markets throughout the country. I have found that a very desirable method of freezing the bagged carcasses is to place the bags or even the entire containers into a liquid nitrogen bath. By immersion in the liquid nitrogen the outer skin of the poultry is immediately frozen and forms a hard "shell" or crust. This substantially hinders loss by evaporation of water from the interior portions during the remainder of the freezing process, and as a result, the carcasses will be frozen with approximately the same water content they contained after removal from the autoclave. Once the poultry has been frozen they are maintained in the liquid bath for any suitable length of time sufficient to bring the temperature to any desired value.

It would also be entirely possible to utilize conventional wind tunnel freezing methods following the vacuum and/or pressure treatment. In such a procedure my vacuum-pressure immersion process is especially desirable because the moisture take-up may be as much as 10% weight so that there may be a substantial loss in the wind tunnel without actual dehydration of the meat. In fact with the large moisture take-up the bird may contain appreciably more moisture after it is unfrozen in the housewife's kitchen than it did when it was freshly killed.

While I have shown and described a preferred form that may be utilized in the practice of my invention I do not wish to be restricted by the showing herein for I contemplate that other variations in my process may be made within the scope of my invention. Accordingly, I do not wish to be limited except by the scope of the following appended claims.

I claim:

1. The method of preparing dressed poultry for shipment and storage which consists in placing it in a treatment zone, drawing a vacuum in such zone in the order of twenty inches of mercury, breaking the vacuum by discharging a bath of cold water into the treatment zone to completely immerse the carcass, increasing the pressure in the zone to approximately ten pounds per square inch gauge, holding the carcass in the treatment zone for approximately two hours, then immersing the carcass in a bath of liquid nitrogen at substantially atmospheric pressure and holding it in such bath until the exterior surface of the carcass is frozen into a continuous shell.

2. The method of preparing dressed poultry for shipment and storage which consists in placing it in a treatment zone, drawing a vacuum in such zone, breaking the vacuum by discharging a bath of cold water into the treatment zone to completely immerse the carcass, holding the carcass in the treatment zone for approximately two hours, then immersing the carcass in a bath of liquid nitrogen at substantially atmosphereic pressure and holding it in such bath until the exterior surface of the carcass is frozen into a continuous shell.

3. The method of preparing dressed poultry for shipment and storage which consists in placing it in a treatment zone, drawing a vacuum in such zone in the order of twenty inches of mercury, breaking the vacuum by discharging a bath of cold water into the treatment zone to completely immerse the carcass, applying pressure to the treatment zone, holding the carcass in the treatment zone for approximately two hours, then immersing the carcass in a bath of liquid nitrogen at substantially atmospheric pressure and holding it in such bath until the exterior surface of the carcass is frozen into a continuous shell.

References Cited in the file of this patent

UNITED STATES PATENTS

| | | |
|---|---|---|
| 1,910,009 | Grayson | May 23, 1933 |
| 2,329,226 | Stafford | Sept. 14, 1943 |
| 2,374,452 | Noyes | Apr. 24, 1945 |
| 2,376,583 | De Poix | May 22, 1945 |
| 2,527,782 | Williams | Oct. 31, 1950 |
| 2,618,939 | Morrison | Nov. 25, 1952 |